3,666,532
DIMENSIONALLY STABLE MATTE-SURFACED POLYESTER DRAFTING FILM

Albert J. Reedy and Walter R. White, Rochester, N.Y., assignors to Eastman Kodak Company, Rochester, N.Y.
No Drawing. Continuation-in-part of application Ser. No. 699,323, Jan. 22, 1968. This application July 2, 1970, Ser. No. 52,098
Int. Cl. B32b 27/36; G03c 1/78
U.S. Cl. 117—76 F                                       6 Claims

ABSTRACT OF THE DISCLOSURE

The eraseability of matte-surfaced polyester sheeting useful in engineering drafting is significantly improved by laying down directly on the matte surface either a thin layer of a polymeric tergel or a two layer configuration, the first layer being a terpolymer based on vinylidene chloride, an unsaturated ester, and an unsaturated carboxylic acid, and the second layer being a very thin gelatin layer.

---

This application is a continuation-in-part of U.S. patent application Ser. No. 699,323, filed Jan. 22, 1968, now Pat. No. 3,589,905, issued June 29, 1971.

This invention relates to methods for improving the inking properties of matte-surfaced polyester sheeting and to the resulting improved sheeting materials.

BACKGROUND

Matte-surfaced polyester sheeting material such as are described in U.S. Pat. No. 3,227,576, and in copending U.S. patent application Ser. No. 611,494, filed Nov. 21, 1966, now Pat. No. 3,370,951, issued Feb. 27, 1968, has found wide acceptance as specialty materials in engineering drafting and related uses. Such matte-surfaced polyester sheeting can be per se employed as a member on which ink and pencil drawings can be made, or it can be overcoated with a suitable unhardened light-sensitive emulsion to provide a photographic film product for use in the photographic reproduction art. Generally, latent images on such photographic film products are developed, and the gelatin in the resulting developed images is hardened to resist removal during washing. The developed "hardened" images are commonly lines of a drawing or the like. That is, the image is a positive one with considerable background or area which is free from image. The emulsion covering the area that is free from image is removed after development by washing, for example, with warm water to lay bare the matte surface for pencil or ink corrections, additions, and the like. The formed image can be easily removed by a rubber eraser if desired. It is also sometimes advantageous to have the matte surface on both sides of the sheeting, even though only one side is to be sensitized.

Suitable sheeting for use in this invention can be prepared from high molecular weight polyesters derived by condensing a dihydric alcohol with a dibasic saturated fatty carboxylic acid or derivatives thereof. Suitable dihydric alcohols for use in preparing polyesters are well known in the art and include any glycol wherein the hydroxyl groups are on the terminal carbon atom and contain from 2 to 12 carbon atoms such as, for example, ethylene glycol, propylene glycol, trimethylene glycol, hexamethylene glycol, decamethylene glycol, dodecamethylene glycol, and 1,4-cyclohexane dimethanol. Dibasic acids that can be employed in preparing polyesters are well known in the art and include those dibasic acids containing from 2 to 16 carbon atoms. Specific examples of suitable dibasic acids include adipic acid, sebacic acid, isophthalic acid, and terephthalic acid. The alkyl esters of the above-enumerated acids can also be employed satisfactorily. Other suitable dihydric alcohols and dibasic acids that can be employed in preparing polyesters from which sheeting can be prepared are described in J. W. Wellman, U.S. Pat. No. 2,720,503, dated Oct. 11, 1955.

Specific preferred examples of polyester resins which, in the form of sheeting, can be used in this invention are poly(ethylene terephthalate), poly(cyclohexane 1,4-dimethylene terephthalate), and the polyester derived by reacting 0.83 mol of dimethyl terephthalate, 0.17 mol of dimethyl isophthalate and at least one mol of 1,4-cyclohexanedimethanol. U.S. Pat. 2,901,466 discloses polyesters prepared from 1,4-cyclohexanedimethanol and their method of preparation.

The thickness of the polyester sheet material employed in carrying out this invention is not critical. Polyester sheeting of a thickness of from about 2 mils to 50 mils can be employed satisfactorily. Usually, for photographic products, the thickness of the polyester sheeting used will be of the order of from about 3 to 5 mils.

Polyesters, and particularly poly(ethylene terephthalate) are very hydrophobic, and the polyester sheeting used in this invention must be provided with an intermediate anchoring layer thereon prior to the application thereto of the matte surface or matte layer. An intermediate anchoring layer is often referred to in the art as a subbing layer, a sub layer, or a substratum layer.

Resins and resin compositions for use in providing anchoring layers or sub layers on a surface of polyester sheeting are well known in the art but nevertheless constitute a part of this invention. A suitable resin for this purpose is a copolymer comprised of, by weight, from about 35 percent to 96 percent of vinylidene chloride, from about 3.5 percent to 64.5 percent of an ethylenically unsaturated ester (also referred to as an acrylic ester), and from about 0.5 to 25 percent of itaconic acid or the half methyl ester of itaconic acid, acrylic acid, or methacrylic acid. The ethylenically unsaturated esters can be acrylonitrile, methacrylonitrile, vinylchloride, and alkyl esters of acrylic and methacrylic acids having 1 to 18 carbon atoms in the alkyl group such as methyl acrylate, ethyl acrylate, butyl acrylate, methyl methacrylate, ethyl methacrylate and butyl methacrylate. A copolymer of the above type that has been used satisfactorily in carrying out this invention is a copolymer of methyl acrylate, vinylidene chloride and itaconic acid, a specific example of such copolymer being one comprised of, by weight, about 15 percent of methyl acrylate, about 83 percent of vinylidene chloride, and 2 percent of itaconic acid.

To establish and maintain adequate and satisfactory adhesion of the sub layer to a surface of the polyester sheeting to which it is applied, and adhesion promoter can be incorporated therein prior to application thereof to a surface of the polyester sheeting. The subbing resins as above described are usually applied from a water dispersion (often referred to as a latex thereof). The amount of adhesion promoter employed should be from about 0.1 percent to 5 percent by weight based on the weight of the subbing resin. Water is employed as a vehicle or carrier for the copolymer and the adhesion promoter when applied to the polyester sheet material. The water is subsequently removed from the applied coating by drying.

Examples of suitable adhesion promoters for this purpose include resorcinol, orcinol, catechol, pyrogallol, 1-naphthol, 2,4-dinitrophenol, 2,4,6-trinitrophenol, 4-chlororesorcinol, 2,4-dihydroxytoluene, 1,3-naphthalenediol, 1,6-naphthalenediol, acrylic acid, the sodium salt of 1-naphthol-4-sulfonic acid, benzyl alcohol, trichloroacetic acid, dichloroacetic acid, o-hydroxybenzotrifluoride, m-hydroxybenzotrifluoride, o-fluorophenol, m-fluorophenol, p-fluorophenol, chloral hydrate, and o-cresol. Mixtures of two or more adhesion promoters can be employed if desired.

To the subbed surface of the polyester sheet material there is applied the matte coating composition.

The "matte" portion of the matte layer can be any of a number of particulate conventional materials, ranging in particle size from about 1 to about 10 microns, that retain their particulate structure on the surface of the film product, the particulate layer (held in place by a hydrophobic resin binding agent) resulting in the desired, rough "matte"-type surface. Typical, nonlimiting examples of suitable "matte" materials include inorganic abrasive materials like silica, glass, quartz, diatomaceous earth, and calcium carbonate as well as organic resinous materials like the polyamide and interpolyamide resins described in U.S. Pat. 3,227,576.

Methods of preparing the subbed, matte-surfaced polyester sheeting to which this invention relates are detailed in the aforementioned U.S. patents and U.S. patent application, the disclosures of which are incorporated by reference into the present disclosure to form an integral part thereof.

THE PROBLEM

At the present time, relatively new, solvent based inks are receiving ever wider acceptance among draftsmen and other artisans who use the matte-surfaced sheeting materials described above. The inks are usually made especially for use on plastic sheets. For some, as yet, unexplainable reason, while the use of such inks on matte-surfaced materials such as those described above results in satisfactory initial image formation, it has been found that where erasures of the inked areas become necessary, complete erasure of the image from the matte surface without destruction of the matte surface itself at that point is sometimes difficult to achieve, with an undesirable, so-called "ghost" of the image often remaining after the ink is apparently removed. Since matte-surfaced polyester sheeting is used commercially in large quantities and by many draftsmen throughout the world, it can be appreciated that a solution to this "ghosting" problem was urgently needed.

THE SOLUTION—THE PRESENT INVENTION

It has now been discovered that the problem of "ghosting" described above can be largely overcome or even solved completely by placing directly on the matte surface either (1) a thin layer of a so-called "tergel," or (2) a two-layer coating consisting essentially of, (a) a thin layer of a special acidic tercopolymer, and (b) a very thin layer of substantially unhardened gelatin. These materials, which will sometimes be referred to herein as the "anti-ghosting" materials of this invention, will be described in more detail below.

Generally, in the successful practice of this invention, the "anti-ghosting" material is laid onto the surface of the hardened, dry, matte layer in the form of a dilute aqueous solution or emulsion. If desired, the solution or emulsion can contain small amounts of adjuvants such as surface active agents, small amounts of organic solvents such as acetone or methylene chloride, preservatives, and/or even an adhesion promoter as described above. The amount of "anti-ghosting" material that is applied to the matte surface can be varied to some extent, depending upon the particular material that is used. For example, when a "tergel" composition is the "anti-ghosting" material, generally from about 1 to about 25, and preferably from about 2.5 to about 15 milligrams of "tergel" per square decimeter of treated matte surface is used in the successful practice of this invention. The use of too little "tergel" results in poorer "anti-ghosting" properties in the resulting product, while too much "tergel" detracts somewhat from the "tooth" of the matte surface. When the terpolymeric "anti-ghosting" material of this invention is used, there should generally be (in the final dried layer) spread fairly evenly over the matte surface from about 1 to about 20, and preferably from about 2 to about 10 milligrams per square decimeter of terpolymer. The gel layer that is then applied over the layer of terpolymer (to yield the desired "anti-ghosting" combination) is extremely thin, and generally contains from about 0.2 to about 25 (preferably from about 0.3 to about 23) milligrams of gelatin per square decimeter of treated surface.

After each of these respective layers is applied, it should be dried in any convenient conventional manner, to remove practically all of the free water. When volatile adhesion promoters are present in the aqueous solutions or emulsions, they, too, are usually removed from the film surface by this treatment. Then the aqueous "anti-ghosting" layer is dried to remove practically all of the free water. The resulting specially treated matte-surfaced polyester film can be used directly, if desired. Or it can be processed still further by having applied (over the thin layer or layers of "anti-ghosting" material which should not be sufficiently thick to adversely effect the roughness or "tooth" of the matte surface) an aqueous gelatin layer, if desired, and subsequently one or more layers of light sensitive emulsion. The application of all of these layers can be made via conventional techniques.

In the following examples, all parts are by weight, unless otherwise stated.

EXAMPLES 1-8

| Example No. | Anti-ghosting material | Parts Water | Surfactant | Adjuvant |
|---|---|---|---|---|
| 1 | Tergel A [a] (800) | 9,199 | [e] 1 | |
| 2 | Tergel A [a] (400) | 9,519 | [e] 1 | Gelatin (80). |
| 3 | do [a] | 9,499 | [e] 1 | Glycerol (100). |
| 4 | Tergel B [b] (800) | 9,199 | [e] 1 | |
| 5 | Tergel C [c] (800) | 9,199 | [e] 1 | Gelatin (40). |
| 6 | Terpolymer A [d] (700) | 9,190 | [f] 1 | Resorcinol (100). |
| 7 | Terpolymer B [g] (700) | 9,175 | [f] 25 | Do. |
| 8 | Terpolymer C [g] (700) | 9,274 | [f] 1 | Colloidal silica (25). |

[a] Acrylonitrile-vinylidene chloride-acrylic acid-gelatin (12/64/7/17).
[b] Acrylonitrile-vinylidene chloride-acrylic acid-gelatin (12/64/7/17).
[c] Acrylonitrile-vinylidene chloride-acrylic acid-gelatin (12/64/7/17).
[d] Acrylonitrile-vinylidene chloride-acrylic acid (15/79/6).
[e] Cetyl betaine.
[f] Saponin.
[g] Acrylonitrile-vinylidene chloride-itaconic acid (15/83/2).

The solutions are cast with a conventional extruder combined with a conventional air knife for thickness control directly onto the hardened matte layer of a matte-surfaced polyester film that has been prepared as described below under the heading "Preparation of Matte-Surfaced Sheet" in an amount sufficient to apply aproximately the coverage set out below in Table 1. The wet film is then dried in a forced draft oven at a temperature of 180° F. Onto the terpolymer layer is then coated a 0.06% aqueous solution of gelatin to yield, when dried, about 0.5 mg. gelatin/square decimeter of surface.

The "tergel" material that can be used as an "anti-ghosting" material in accordance with the present invention is a composition comprising the polymerization product of, (1) from about 5 to 45 percent by weight of a monomer selected from the group consisting of acrylonitrile, methacrylonitrile and alkyl acrylates wherein the alkyl group contains 1 to 6 carbon atoms, (2) from about 50 to 89 percent by weight of vinylidene chloride, (3) from about 2 to 12 percent by weight of a monomer selected from the group consisting of acrylic acid, itaconic acid and monomethyl itaconate, the total of (1), (2) and (3) being 100 percent, and (4) from about 15 to 60 percent by weight of gelatin upon the total weight of (1), (2) and (3).

However, it is preferably the polymerization product of, (1) from about 9 to 30 percent by weight of a monomer selected from the group consisting of acrylonitrile, and methyl acrylate, (2) from about 50 to 89 percent by weight of vinylidene chloride monomer,
(3) from about 2 to 12 percent by weight of a monomer selected from the group consisting of acrylic acid, itaconic acid and monomethyl itaconate, the total of (1), (2) and (3) being 100 percent, and
(4) from about 15 to 60 percent by weight of gelatin based upon the total weight of (1), (2) and (3).

Methods of manufacture and handling of such "tergel" compositions are detailed in U.S. Pat. No. 3,501,301, and therefore need not be detailed herein. The name "tergel" is derived from the combination of "terpolymer" and "gelatin." From the disclosure of said U.S. Pat. No. 3,501,301, it can be appreciated that "tergel" compositions are preferably applied to films in the form of acidic aqueous solutions or dispersions containing from about 2 to about 20 weight percent of total solids, and from about 0.2 to about 5 weight percent of an organic adhesion promoter (such as resorcinol and those others described above). It has also been found that still better "anti-ghosting" properties can be obtained in the final treated matte-surfaced sheeting of this invention if the acidic aqueous "tergel" composition contains, additionally, from about 0.1 to about 2, and preferably from about 0.2 to about 1 weight percent of gelatin when it is applied to the matte surface. The "terpolymer" anti-ghosting material of this invention is substantially the same terpolymeric material (consisting essentially of vinylidene chloride, an acrylic ester, and a carboxylic acid) as those described hereinbefore (as being useful in providing anchoring or "sub" layers at the surface of polyester sheet). In fact, the only difference between the terpolymers that are useful as "anti-ghosting" materials in accordance with the present invention and those that are useful as subs for polyester film surfaces is that the terpolymeric "anti-ghosting" materials must contain at least about 3 "percent equivalents" of carboxylic acid per polymer unit. Thus, if the carboxylic acid portion of the terpolymer has only a single carboxylic acid group in its molecule (such as acrylic acid and methacrylic acid, for example) the terpolymer must contain at least about 3 mole percent of the material, whereas if the carboxylic acid bearing component of the terpolymer has two carboxylic acid groups per molecule (as has, for example, itaconic acid), then there need be only at least about 1.5 mole percent of the material in the terpolymer.

TABLE 1

Coverage data

| Example No.: | Mg./sq. decimeter |
|---|---|
| 1 | 5 |
| 2 | 2.8 |
| 3 | 2.7 |
| 4 | 5.25 |
| 5 | 5.1 |
| 6 | 4.4 |
| 7 | 4.9 |
| 8 | 4.9 |

The resulting films have substantially no "ghosting" problems even if they have been washed for a long period in water prior to the test.

To prepare photographic film products for use in the photographic reproduction art using the specially treated matte-surfaced polyester sheeting of this invention, the treated matte surface is overcoated with a substantially unhardened light-sensitive (preferably silver halide) emulsion layer (and optionally, first with a gelatin layer) by conventional means.

PREPARATION OF MATTE-SURFACED SHEET (A) About 51.3 parts of water, 0.74 part of the water soluble polymer of acrylic acid crosslinked with 1% of a polyallyl ether of sucrose having an average of about 5.8 allyl groups for each molecule of sucrose (Carbopol 934), 40 parts of silica having an average particle size of about 5 microns, 6.8 parts of titanium dioxide pigment, 0.011 part of blue pigment (Monarch Blue Toner NCX2371, new color index 74160), 0.004 part of violet pigment (Monastral Violet R RT 7330, color index pigment violet index 19), and 0.62 part of a 4% solution of p-chloro-m-xylenol dissolved in methanol, are ball-milled in a ball mill for about 20 hours to provide a pourable paste. The pH of the paste is adjusted to about 5.5 by adding thereto ammonium hydroxide (28%).

(B) A substantially stable resin latex is prepared by thoroughly admixing about 30 parts of a resin consisting of, by weight, 15% acrylonitrile, 83% vinylidene chloride, and 2% acrylic acid, about 70 parts of water, and about 0.44 part of sodium, [-(p-tert-octyl phenoxy)] ethane sulfonate (Triton 770). The pH of this latex is adjusted to about 6.4 by adding thereto ammonium hydroxide (28%).

(C) A coating composition for application to a subbed surface of poly(ethylene terephthalate) sheeting is then prepared by thoroughly admixing about 27 parts of the paste of step A, above, and about 73 parts of the latex of step B, above.

The coating composition of step C is applied to the subbed surface of a biaxially oriented poly(ethylene terephthalate) sheet of a thickness of about 5 mils which is subbed on one surface with a sub layer comprised of a resin consisting of, by weight, 15% methacrylate, 83% vinylidene chloride, and 2% itaconic acid in an amount sufficient to provide thereon, after drying, a matte surface layer of a thickness of about 0.4 mil. The applied coating composition is dried by conduction heat transfer by impinging air on the uncoated surface of the poly(ethylene terephthalic sheet material, the air being maintained at a temperature of about 200° F.

The invention has been described in detail with particular reference to preferred embodiments thereof, but it will be understood that variations and modifications can be effected within the spirit and scope of the invention.

We claim:

1. In a dimensionally stable drafting film comprising a flexible, biaxially oriented macromolecular polyester film corresponding to the polyesterification product of at least one dicarboxylic acid and at least one glycol; said drafting film being coated on at least one surface, in order, with a sub layer and a matte layer; the improvement which comprises an effective amount of an anti-ghosting material coated on said matte layer; wherein said anti-ghosting material is
   (a) from about 1 to about 25 milligrams of a tergel per square decimeter of said matter surface, or
   (b) a first layer of a terpolymer consisting essentially of
      (1) from about 35 to about 96 mole percent of vinylidene chloride,
      (2) from about 3.5 to about 64.5 mole percent of an acrylic ester, and
      (3) from about 1.5 to about 25 mole percent of an acidic material selected from the group consisting of acrylic acid, methacrylic acid, itaconic acid and the half methyl ester of itaconic acid and a second layer which consists essentially of from about 0.2 to about 2.5 milligrams of gelatin per square decimeter of treated film surface.

2. An improved, dimensionally stable drafting film as in claim 1, wherein said tergel is the polymerization product of
   (1) from about 5 to 45 percent by weight of a monomer selected from the group consisting of acrylonitrile, methacrylonitrile and alkyl acrylates wherein the alkyl group contains 1 to 6 carbon atoms,
   (2) from about 50 to 89 percent by weight of vinylidene chloride, (3) from about 2 to 12 percent by weight of a monomer selected from the group consisting of acrylic acid, itaconic acid and monomethyl itaconate, the total of (1), (2), and (3) being 100 percent, and (4) from about 15 to 60 percent by weight of gelatin upon the total weight of (1), (2), and (3).

3. An improved, dimensionally stable drafting film as in caim 1, wherein said tergel is the polymerization product of (1) from about 9 to 30 percent by weight of a monomer selected from the group consisting of acrylonitrile, and methyl acrylate, (2) from about 50 to 89 percent by weight of vinylidene chloride monomer, (3) from about 2 to 12 percent by weight of a monomer selected from the group consisting of acrylic acid, itaconic acid and monomethyl itaconate, the total of (1), (2), and (3) being 100 percent, and (4) from about 15 to 60 percent by weight of gelatin based upon the total weight of (1), (2), and (3).

4. An improved, dimensionally stable drafting film as in claim 3 wherein said layer of tergel contains additionally from about 0.1 to about 2 weight percent of gelatin.

5. An improved, dimensionally stable drafting film as in claim 1, wherein said acrylic ester is selected from the group consisting of acrylonitrile, methacrylonitrile, methyl acrylate, ethyl acrylate, and methyl methacrylate.

6. An improved, dimensionally stable drafting film as in claim 5, wherein said acrylic ester is acrylonitrile, and said acidic material is selected from the group consisting of acrylic acid and itaconic acid.

References Cited

UNITED STATES PATENTS

| 3,053,661 | 9/1962 | Starck et al. | 96—87 R |
| 3,227,576 | 1/1966 | Van Stappen | 117—76 F |
| 3,370,951 | 2/1968 | Hasenauer | 96—87 R |
| 3,447,947 | 6/1969 | Abbott et al. | 117—76 F X |
| 3,501,301 | 3/1970 | Nadeav et al. | 117—161 UC X |
| 3,539,476 | 11/1970 | Dolce et al. | 96—87 R X |

FOREIGN PATENTS

| 1,002,905 | 7/1965 | Great Britain | 117—138.8 F |
| 1,072,122 | 6/1967 | Great Britain | 117—138.8 F |
| 1,090,056 | 11/1967 | Great Britain | 117—138.8 F |

WILLIAM D. MARTIN, Primary Examiner

R. HUSACK, Assistant Examiner

U.S. Cl. X.R.

96—87R; 117—83, 138.8 F